(12) United States Patent
Appleyard

(10) Patent No.: US 6,675,565 B2
(45) Date of Patent: Jan. 13, 2004

(54) WEEDCUTTING MACHINE

(76) Inventor: Richard Appleyard, 1314 College Ave., Russellville, AL (US) 35653

( * ) Notice: Subject to any disclaimer, the term of this patent is extended or adjusted under 35 U.S.C. 154(b) by 0 days.

(21) Appl. No.: 09/991,910

(22) Filed: Nov. 26, 2001

(65) Prior Publication Data

US 2002/0078673 A1 Jun. 27, 2002

Related U.S. Application Data

(60) Provisional application No. 60/255,412, filed on Dec. 15, 2000.

(51) Int. Cl.⁷ ............................................... A01D 34/81
(52) U.S. Cl. ....................................... 56/12.7; 56/320.1
(58) Field of Search ................................ 56/12.7, 16.7, 56/17.1, 17.2, 320.1, DIG. 20

(56) References Cited

U.S. PATENT DOCUMENTS

| | | | |
|---|---|---|---|
| 4,182,100 A | | 1/1980 | Letter |
| 4,411,126 A | | 10/1983 | Lowry et al. |
| 4,531,350 A | | 7/1985 | Huthmacher |
| 4,688,376 A | | 8/1987 | Wolfe, Sr. |
| 4,704,849 A | | 11/1987 | Gilbert et al. |
| 4,796,415 A | | 1/1989 | Moore |
| 4,829,755 A | * | 5/1989 | Nance .......................... 56/17.1 |
| 4,873,819 A | * | 10/1989 | Shivers et al. ................ 56/12.7 |
| 4,922,694 A | | 5/1990 | Emoto |
| 5,092,112 A | * | 3/1992 | Buckendorf, Jr. ............. 56/17.5 |
| 5,313,770 A | * | 5/1994 | Smothers ..................... 56/12.7 |
| D356,583 S | * | 3/1995 | Cordova ....................... D15/17 |
| 5,408,816 A | | 4/1995 | Cartier |
| 5,467,584 A | * | 11/1995 | Boyles ......................... 56/12.7 |
| 5,577,374 A | * | 11/1996 | Huston ......................... 56/12.7 |
| 5,771,670 A | | 6/1998 | Perry |
| 5,791,054 A | | 8/1998 | Bessinger |
| 5,829,236 A | | 11/1998 | Ballard et al. |
| 5,836,142 A | * | 11/1998 | Maxwell ...................... 56/16.7 |
| D402,297 S | | 12/1998 | Rappolt |
| 5,852,876 A | | 12/1998 | Wang |
| 5,970,694 A | | 10/1999 | Knox, Jr. |
| 6,050,069 A | * | 4/2000 | Elensky ....................... 56/16.7 |
| 6,085,503 A | * | 7/2000 | Hutchinson .................. 56/12.7 |
| 6,363,699 B1 | * | 4/2002 | Wang ........................... 56/12.7 |

FOREIGN PATENT DOCUMENTS

| | | |
|---|---|---|
| DE | 1 161 069 | 1/1964 |
| DE | 2 246 232 | 1/1973 |

* cited by examiner

Primary Examiner—Robert E. Pezzuto
Assistant Examiner—Nathan Mammen
(74) Attorney, Agent, or Firm—Richard C. Litman

(57) ABSTRACT

A wheeled attachment for a weed trimmer using string or blades, the wheeled attachment being adjustable along the shaft of the weed trimmer, thus to adjust the height of the trimmer. There is a centered bump wheel beneath the cutter head of the trimmer. Other embodiments employ a single wheel for the attachment assembly to a trimmer's shaft. A weed trimmer has a motor attached in-line on a shaft having a median projecting handle and a terminal handle.

8 Claims, 7 Drawing Sheets

WEEDCUTTING MACHINE

CROSS-REFERENCE TO RELATED APPLICATION

This application claims the benefit of U.S. Provisional Patent Application Serial No. 60/255,412, filed Dec. 15, 2000.

BACKGROUND OF THE INVENTION

1. Field of the Invention

The present invention relates generally to motorized vegetation trimmer apparatus. More specifically, the invention is a weed trimmer using string or blades having a wheel attachment which is adjustable in height and having rear wheels and a centered front bump ball wheel.

2. Description of Related Art

The related art of interest describes various weed cutter machines with attachments, but none discloses the present invention. There is a need for a tripod weed cutter machine attachment which permits adjustment in height for the shaft and for the cutter element via a front bump ball wheel.

The related art will be discussed in the order of perceived relevance to the present invention. These patents neither suggest nor teach the advantage of a pivoting wheel attached to the trimmer head.

U.S. Pat. No. 4,531,350 issued on Jul. 30, 1985, to Edward A. Huthmacher describes a tripod wheeled assembly for grass trimmers comprising a two-part detachable joint which supports an inverted V-shaped rod frame underneath the shaft having adjustable height means. The V-shaped front frame section supports two wheels in front and an L-shaped leg and rear wheel forming a tripod. The attachment is distinguishable for having two wheels of the tripod assembly in front of the trimmer.

U.S. Pat. No. 5,970,694 issued on Oct. 26, 1999, to Robert J. Knox, Jr. describes a quick mount leveling, adjustable and folding tripod roller stabilizer for string trimmers comprising a pair of circular clamping plates, a rear leg, two lateral side legs, swiveling wheels on each leg, a slider actuator for folding mounted on the rear leg, and articulating linkage joining the actuator to the clamping plates. The apparatus is distinguishable for having three separate and foldable tripod legs.

U.S. Pat. No. 4,688,376 issued on Aug. 25, 1987, to Donald E. Wolfe, Sr. describes an adjustable carriage for electric string trimmers comprising a triangular tubular frame having castor wheels at each vertex and a pair of parallel pivotal bars attached by a pair of clamps to the trimmer housing. One pivotal bar is anchored by a clamp bracket and a threaded hooked rod. The carriage is distinguishable for its triangular rod structure and clamp release means.

U.S. Pat. No. 5,829,236 issued on Nov. 3, 1998, to Jonathan D. Ballard et al. describes a three-wheeled carrier for a gas powered grass trimmer comprising a three-sided handle member with a terminal trigger supported by first and second mounting members which are further attached to a base support frame having a rear U-shaped frame with two support braces adjacent the rear wheels. The front wheel is pivotable. The carrier is distinguishable for its involved structure.

U.S. Pat. No. 4,704,849 issued on Nov. 10, 1987, to Zachery R. Gilbert et al. describes a four wheel-mounted weed trimmer comprising a two-piece yoke wherein each piece supports an inverted V-shaped tubular frame member having apertures on a rear leg for adjustment in inclination of the attached weed trimmer shaft. The weed trimmer is distinguishable for its four-wheeled structure.

U.S. Pat. No. 4,182,100 issued on Jan. 8, 1980, to Joseph D. Letter describes a lawn mower and edger carriage comprising a tubular framework requiring handle bars, a U-shaped support yoke having coiled springs attached to a clamp ring around the mower column, a Y-shaped framework for supporting the three swivel wheels, and a vertical brace connected to the power head by tie bolts and a ball socket. The carriage is distinguishable for its yoked front wheel structure and vertical posts.

U.S. Design Pat. No. 402,297 issued on Dec. 8, 1998, to Peter L. Rappolt describes a 2-wheeled attachment for a brush cutter comprising a housing having two caster wheels at the ends and a shaft clamp having an adjustable length on the housing. The attachment is distinguishable for its clamping structure.

U.S. Pat. No. 5,771,670 issued on Jun. 30, 1998, to Ben C. Perry describes a balanced two-wheeled grass and weed trimmer apparatus comprising a triangular base frame which integrates the power head. The trimmer is distinguishable for its integrated structure having only two wheels.

U.S. Pat. No. 4,922,694 issued on May 8, 1990, to Clesson T. Emoto describes a 2-wheeled support for a line trimmer comprising an A-frame attached by a clamp assembly to the shaft and having two wheels on its legs. The trimmer is distinguishable for its two-wheeled A-frame structure.

U.S. Pat. No. 5,092,112 issued on Mar. 3, 1992, to Rudy R. Buckendorf, Jr. describes three different grass trimmer attachments comprising a mounting bar with two wheels which can be caster wheels mounted either on the trimmer housing by hooks or on the shaft by two- or three-linked clamping bracket. The trimmer attachments are distinguishable for being limited to two-wheel attachments.

U.S. Pat. No. 5,408,816 issued on Apr. 25, 1995, to Lucille L. Cartier describes two three-wheeled, propelled carriages for horticultural devices comprising an elongated handled frame clamped to the elongated shaft of the trimmer and requiring a loose connecting rod, which frame comprising a U-shaped tubular frame supporting two large diameter wheels and a small rotatable front wheel. One embodiment includes another subframe for the front wheel. The carriages are distinguishable for their unique structure.

U.S. Pat. No. 4,796,415 issued on Jan. 10, 1989, to Mark R. Moore describes a dolly for line trimming apparatus comprising three wheels which are rotatable in position. The planar dolly is attached to the trimmer shaft by a clamp. The dolly is distinguishable for its dissimilar structure.

U.S. Pat. No. 4,411,126 issued on Oct. 25, 1983, to Joseph M. Lowry et al. describes a four-wheeled carriage for a grass trimmer comprising a rectangular platform having a clamp and a hole for positioning the head of the trimmer. The wheels are adjustable in height and lateral width. The carriage is distinguishable for its four-wheel structure.

U.S. Design Pat. No. 357,690 issued on Apr. 25, 1995, to Doris M. Gobel describes an electric string cutting lawn mower having four wheels comprising a tubular bracket for the mower shaft which supports two tubular inverted V-shaped frames for the wheels fore and aft of the trimmer head. The wheel assembly is distinguishable for its four-wheel structure.

U.S. Pat. No. 5,791,054 issued on Aug. 11, 1998, to Henry J. Bessinger describes rotary string cutters having a central bottom portion for attaching a bolt.

U.S. Pat. No. 5,852,876 issued on Dec. 29, 1998, to Hung T. Wang describes a vegetation trimmer head having three rigid blades and a central bottom portion for attaching a bolt.

German Patent Application No. 1,161,069 published on Jan. 9, 1964, for Hans-Peter Vellenzer describes a mulching appliance comprising a large wheel which can be rotated from front to back of a wheel housing having two small rear wheels. The appliance is distinguishable for its rotatable plane structure.

German Patent Application No. 2,246,232 published on Apr. 12, 1973, for Shiro Mizubata et al. describes a lawn mower having a U-shaped frame supporting two large wheels in front and a small wheel in the rear. The frame is hinged to a forked handle. The mower apparatus is placed between the front wheels. The lawn mower is distinguishable for its different structure.

None of the above inventions and patents, taken either singly or in combination, is seen to describe the instant invention as claimed.

SUMMARY OF THE INVENTION

The present invention is a modified weed trimmer using string or blades positioned on a center bump ball wheel, and having a single wheel or two-wheel housing attachment assembly which is adjustable in height on a conventional or modified trimmer shaft. The first embodiment utilizes a two-wheeled carrier housing attachment supporting the shaft with a ball bump wheel added to the cutter head. A second embodiment is a housing unit replacing the conventional cutter cover, and comprising a triangular housing unit with a fender for the single wheel placed at the base portion of the triangular housing unit. A third embodiment modifies the second embodiment housing by placing the wheel outside the base portion.

A fourth embodiment comprises an arcuate guard cover having an arcuate upper planar portion with a pair of wheels at its ends and a cylindrical side portion. A fifth embodiment is a housing unit comprising a substantially semicircular housing having a conical top with a cylindrical side and with a pair of wheels at its rear. A sixth embodiment utilizes a similar shaped housing unit as the third embodiment except that the pair of wheels are positioned on the sides.

A seventh embodiment comprises a triangular shaped housing with two side wheels and a front extension to hold the shaft and bump ball wheel. The electric motor has been displaced closer to the cutter element on the shaft for improving the balance of the tool. An eighth embodiment is a transparent plastic bag with replacement parts suitable for sale and for storage by the user in the shed or garage on a wall.

The center ball bump wheel in these aforementioned embodiments are made to attach to any marketed trimmer by simply pulling off the cutter spool head and replacing with the ball bump wheel.

Accordingly, it is a principal object of the invention to provide a center bump ball wheel attached to the cutter portion and a wheeled attachment for a weed trimmer.

It is another object of the invention to provide a one or two wheeled cover attachment positioned behind the weed trimmer head.

It is a further objective to provide a wheeled attachment for a weed trimmer that includes a protective guard member for preventing weed trimmings and other debris from coming into contact with the user of the weed trimmer.

Still another object of the invention is to provide a transparent plastic storage unit for packaging and hanging the weed trimmer accessories.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
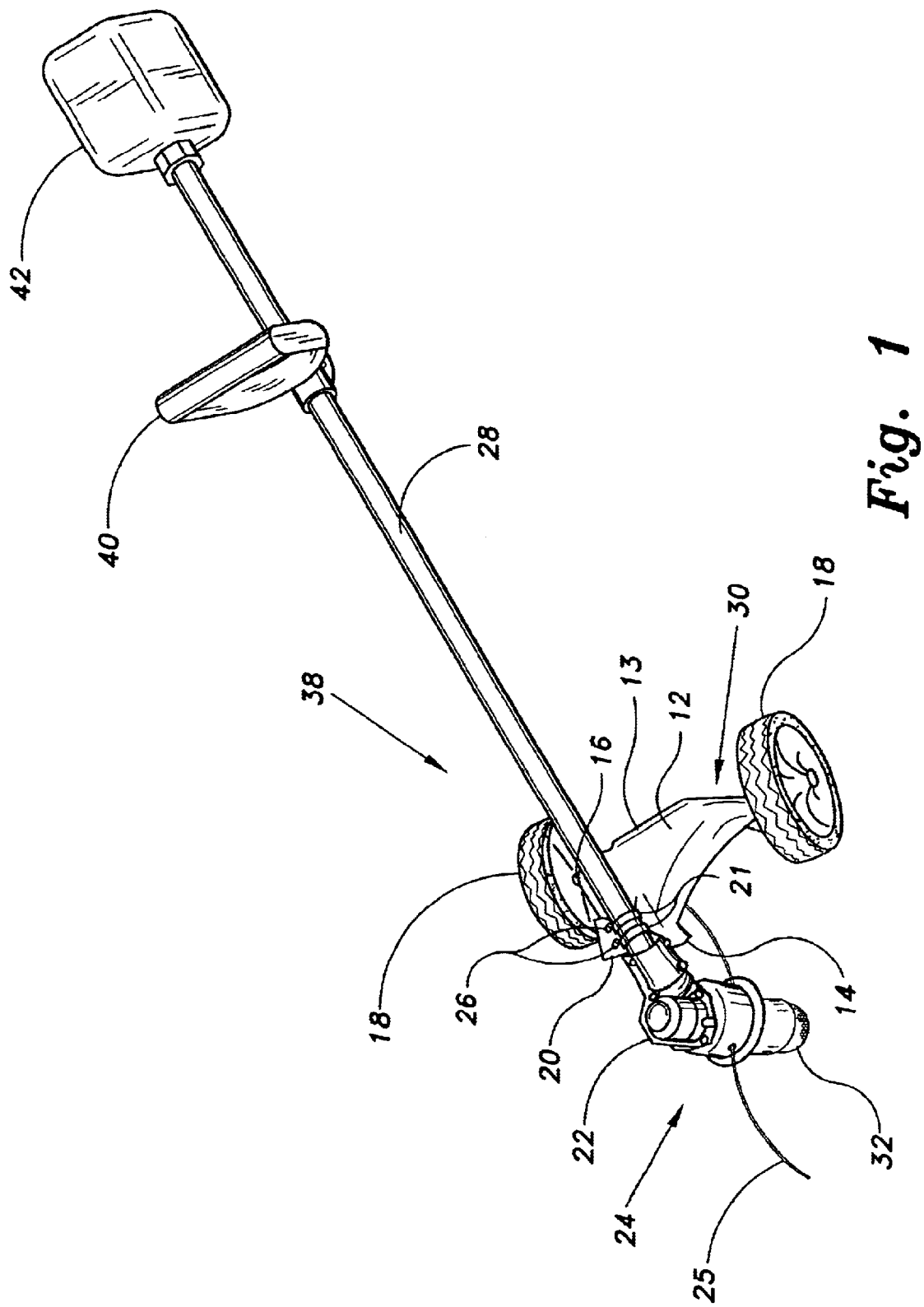
FIG. 1 is an environmental, perspective view of a first embodiment of a two-wheeled attachment assembly and a centered ball bump wheel on a weed trimmer according to the present invention.
Figure 2:
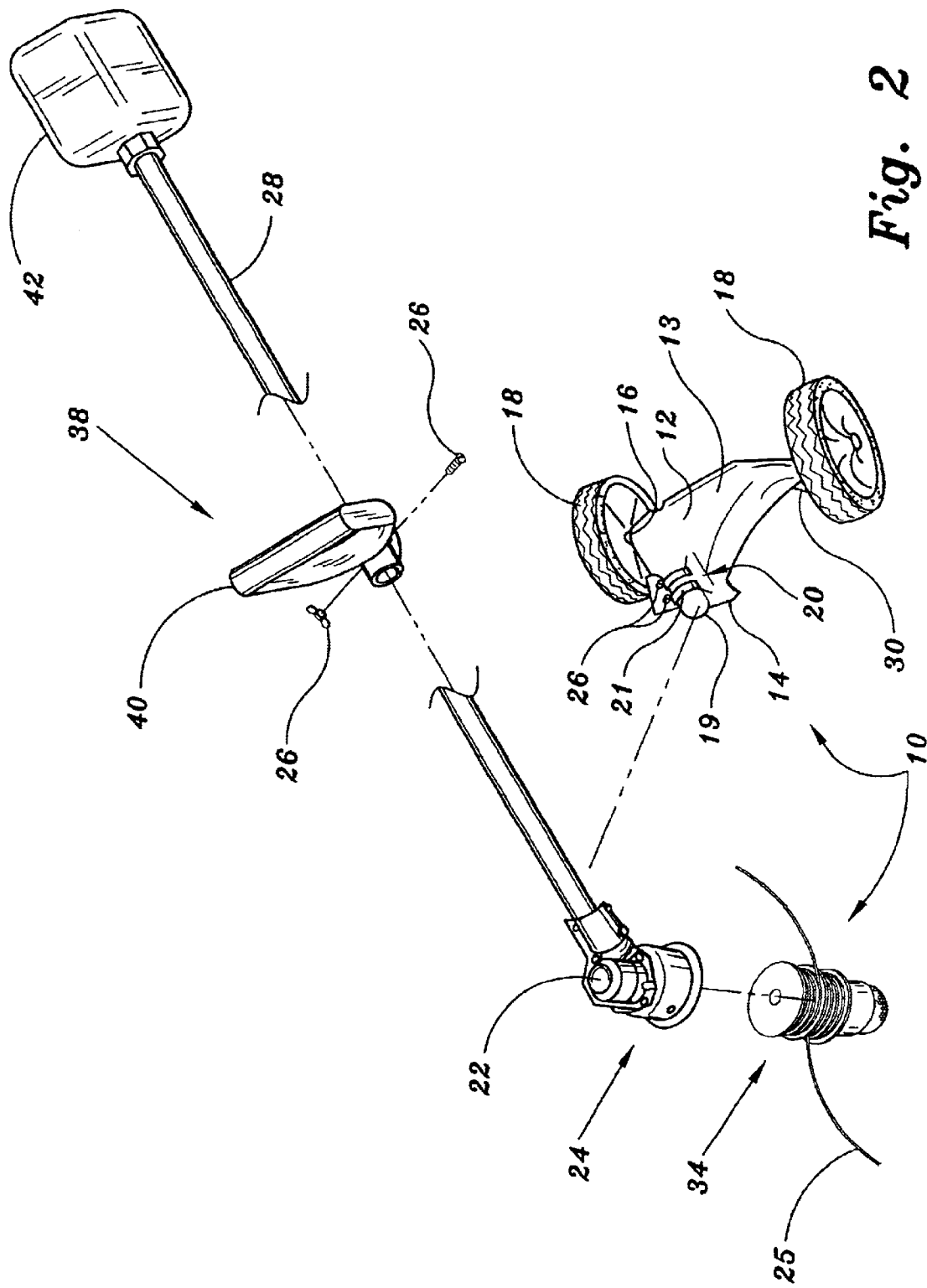
FIG. 2 is an exploded view of the FIG. 2 wheeled attachment.

The present invention is directed in FIGS. 1 and 2 to a first embodiment of a two-part weed trimmer attachment 10 comprising a rigid curvilinear triangular wheel housing 12 configured with a base portion 13 and an apex portion 14. A wheel supporting axle 16 is positioned along the basal axis of the wheel housing 12 and supports a pair of wheels 18 at each end of the base 13. The apex bracket 20 is attached to a groove 19 by removable straps 21 formed in the apex 14 of the wheel housing 12 for attachment adjacent the motorized head 22 of a string cutter machine 24 having nylon cutting strings 25. The bracket 20 is fastened together by fasteners 26 to enable height adjustment of the bracket along the shaft 28 of the weed cutter machine 24 which can alternatively be a metal bladed machine. A conventional adjustable height means 30 is available for the pair of wheels.

A centered bump ball wheel 32 is configured for stable attachment to the motorized head 22.

Figure 8:
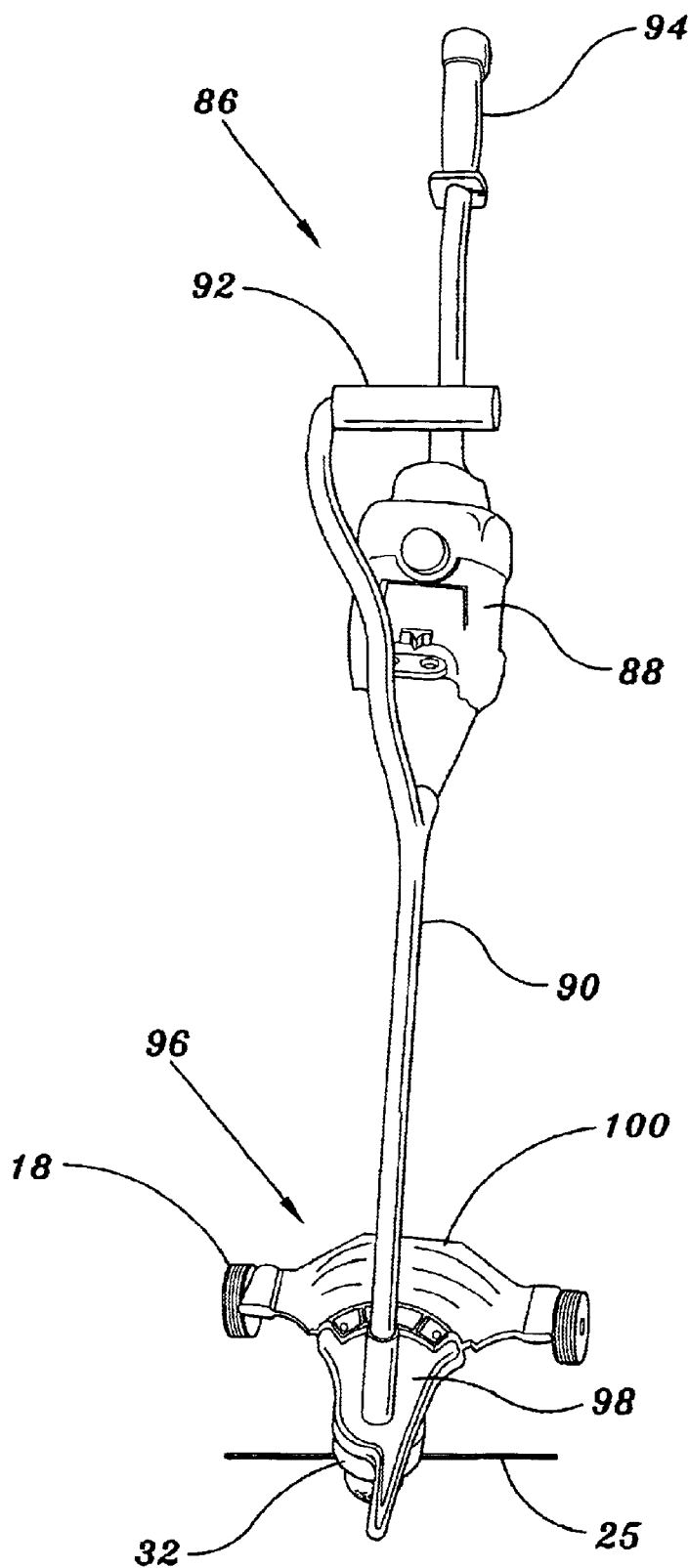
FIG. 8 is a front perspective view of a two-wheeled housing connected to the cutter element by an extension and the motor attached closer to the cutter element as a seventh embodiment.

The motorized trimmer 38 has a handle 40 on the shaft 28 and either an electric or gas-powered motor 42. The details of powering the cutter 24 from motor 42 are conventional and well known to those skilled in the art. If desired, the motor 42 could be mounted lower on shaft 28, either above (or even below) handle 40 as illustrated in FIG. 8 as an eighth embodiment and the balance of the tool will be improved even with a second end handle as discussed below.

Figure 3:
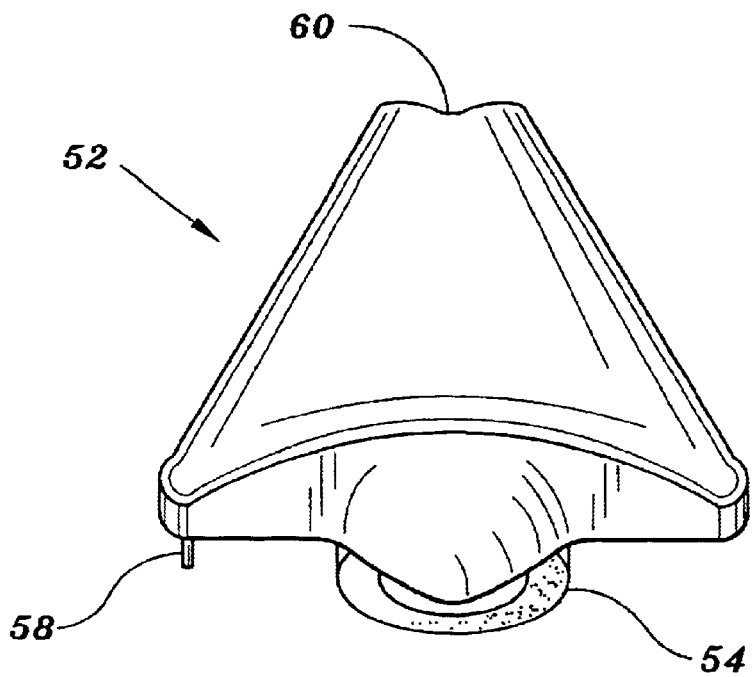
FIG. 3 is a top perspective view of a second embodiment of a wheeled attachment assembly for a weed trimmer with a single wheel under a fender and a wheel height adjustment means.

FIG. 3 illustrates a second embodiment of a wheeled attachment assembly 52 in a perspective view for a weed trimmer with a single wheel 54 under a fender 56 and having a wheel height adjustment means 58. The assembly 52 is attached at its apex portion 60 to the shaft of the trimmer. The wheel axle is hidden.

Figure 4:
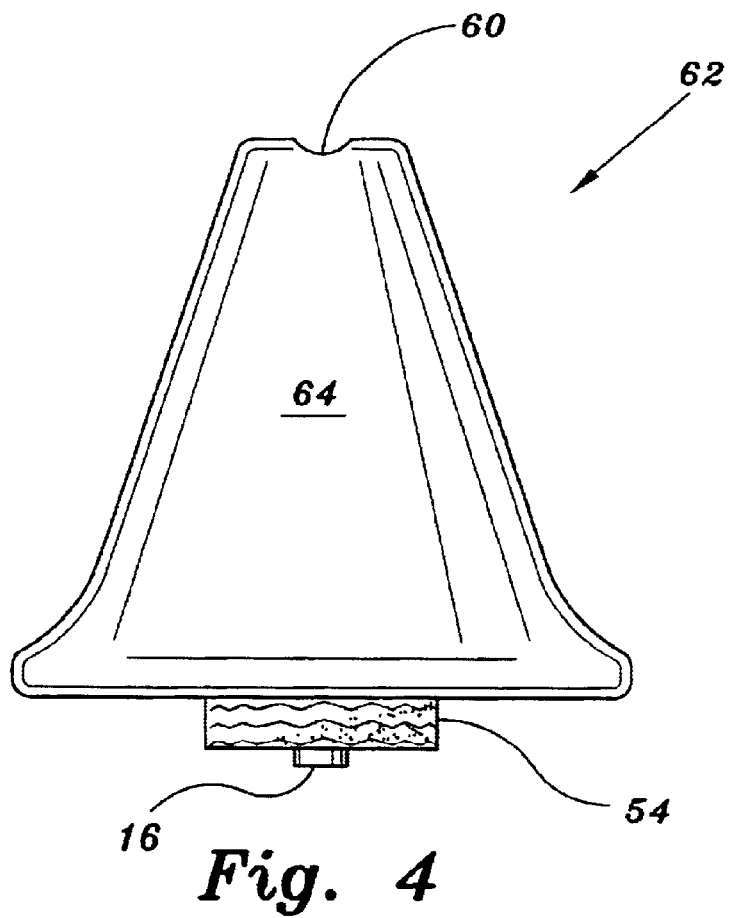
FIG. 4 is a top plan view of a third embodiment of a wheeled attachment assembly for a weed trimmer with an exposed single wheel.

FIG. 4 discloses a third embodiment of a wheeled attachment assembly 62 in a top plan view having the wheel 54 outside the housing 64 and centered on an axle 16.

Figure 5:
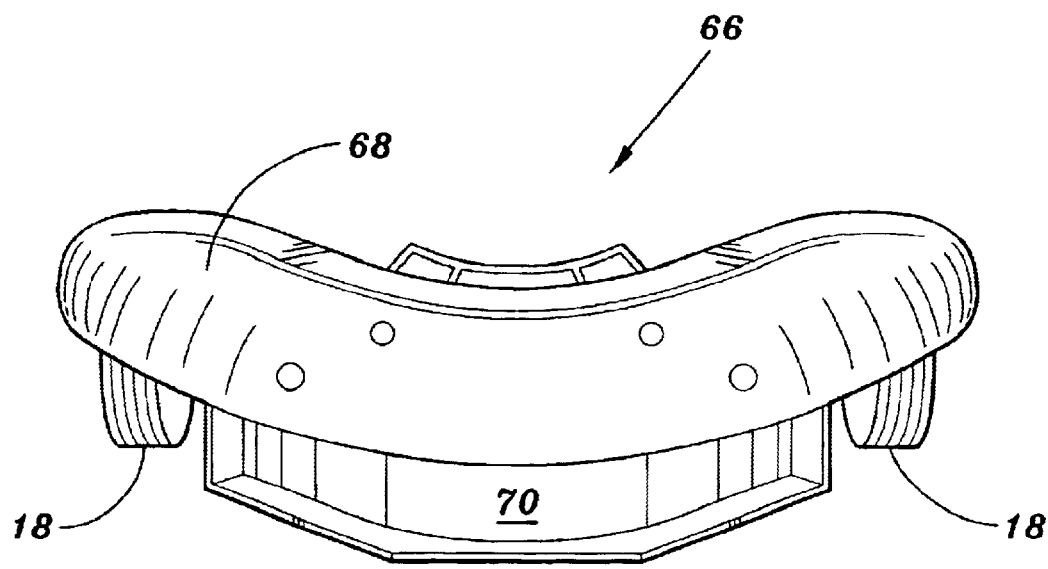
FIG. 5 is a rear perspective view of a fourth embodiment of a housing with two side wheels positioned under an overlapping member.

FIG. 5 shows a fourth embodiment of a wheeled attachment assembly 66 for a weed trimmer with a pair of wheels 18 protected under an integrated winged fender portion 68 and an arcuate front fender portion 70. The apex portion 60 attaches to the trimmer shaft.

Figure 6:
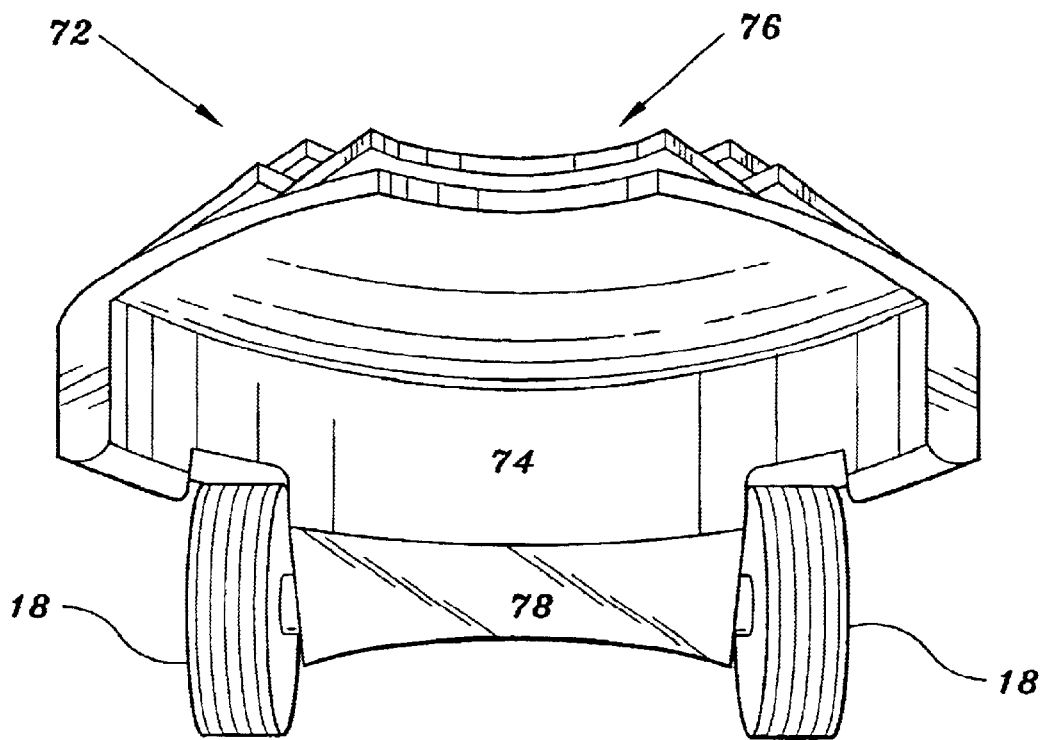
FIG. 6 is a top plan view of a fifth embodiment of a housing with two rear wheels positioned closer together.

FIG. 6 depicts a fifth embodiment of a wheeled attachment assembly 72 for a weed trimmer with a pair of wheels 18 on axle 16 positioned closer together with the axle 16 protected by a semicircular housing 74 having rear extensions 76 and a front protective portion 78 in front of the axle 16.

Figure 7:
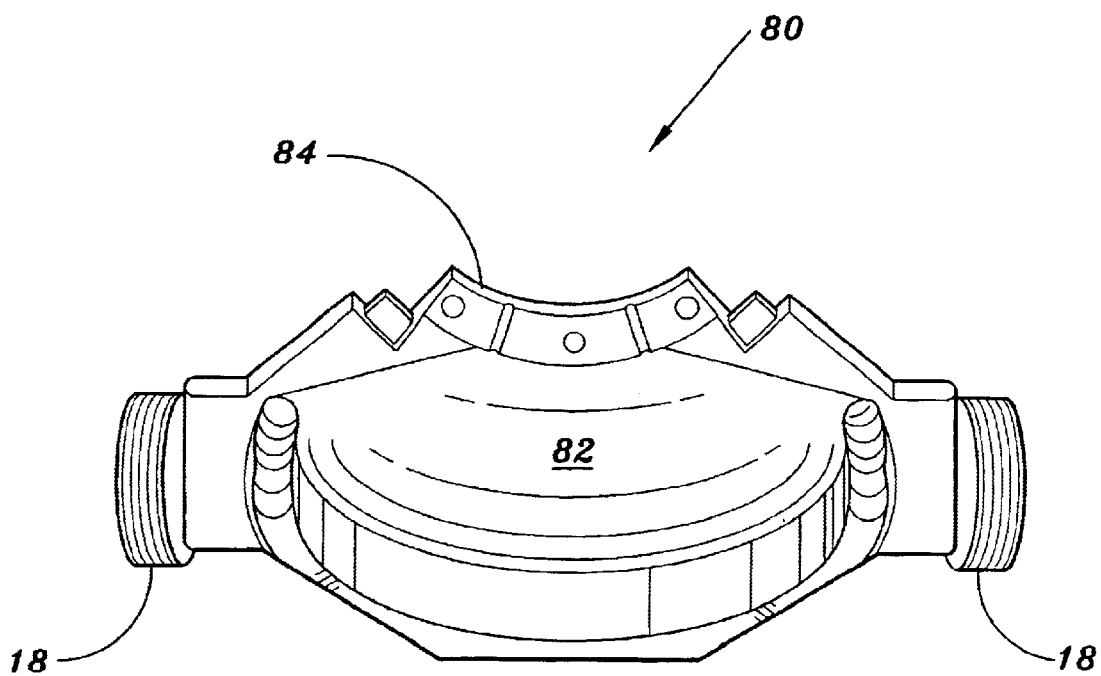
FIG. 7 is a top plan view of a sixth embodiment of a housing with two wheels positioned on the outermost sides of the housing.

FIG. 7 discloses a sixth embodiment of a wheeled attachment assembly 80 for a weed trimmer with a pair of wheels 18 on a hidden axle positioned as far apart as feasible. The housing 82 is semicircular with its attachment portion 84 to the trimmer shaft apertured.

FIG. 8 illustrates a seventh embodiment of a modified weed trimmer apparatus 86 with an in-line gas motor 88 lowered on the shaft 90 between a front handle 92 and a rear handle 94 to improve its balance. The housing 96 has an irregularly shaped front portion 98 housing the ball wheel 32 with its nylon string cutter 25. The rear housing portion 100 is attached to the front portion 98 by fasteners 26 and supports the widely separated pair of wheels 18. It should be noted that the cutting assembly portion is attached to the shaft 90 at an inclined angle.

Thus, a weed cutter machine can be readily and economically modified to employ a tripod wheeled means with height adjustment for improvement in stability on a ground surface.

Figure 9:
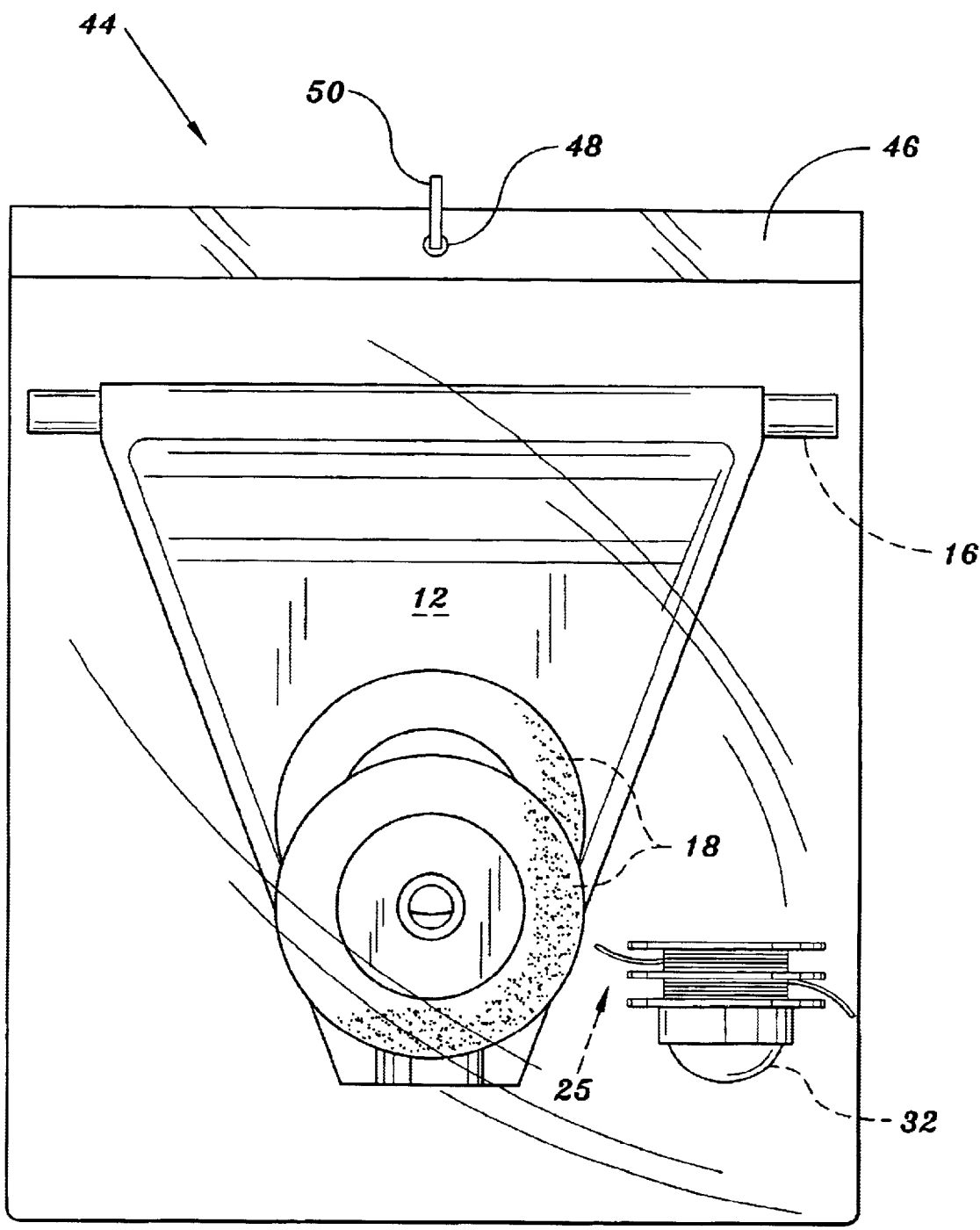
FIG. 9 is a front elevational view of a transparent plastic storage bag containing the accessory parts of the first embodiment for hanging on a wall.

In FIG. 9, as an eighth embodiment, a translucent plastic storage bag 44 having a fold-over flap 46 with metal grommeted apertures 48 for hanging on a hook 50 is illustrated for conveniently containing the attachment parts, these including wheel housing 12, axle 16, two wheels 18, and ball wheel 32.

It is to be understood that the present invention is not limited to the sole embodiment described above, but encompasses any and all embodiments within the scope of the following claims.

I claim:

1. A weed trimmer attachment device for a weed cutting machine, comprising:
   a rigid guard member of unitary construction, said guard member being configured with a rear base region, an inclined front region, and a groove formed in said inclined front region;
   an axle secured to the rear base region of said guard member, and a pair of wheels rotatably mounted on said axle at opposite ends of the base region to provide a wheeled guard structure;
   a bracket attached to the front region of said guard member for slidably attaching said weed trimmer attachment device along a shaft of the weed cutting machine, said bracket further including means for adjustably affixing said bracket along the shaft of the weed cutting machine, for height adjustment of the weed cutting machine;
   a plurality of removable straps for releasably attaching said bracket to the groove formed in said front region; and
   a bump wheel configured for stable attachment to a motorized head of the weed cutting machine;
   whereby, said bump wheel and said wheeled guard structure when attached to the weed cutting machine provides a wheeled tripod arrangement for improved stability of the cutting machine on a ground surface, and said guard member prevents weed trimmings from coming into contact with a user of the weed cutting machine.

2. The weed trimmer attachment device according to claim 1, wherein said guard member has a curvilinear triangular configuration.

3. The weed trimmer attachment device according to claim 1, wherein said guard member has a semicircular configuration.

4. The weed trimmer attachment device according to claim 1, including means for adjusting the height of said pair of wheels.

5. A weed trimmer apparatus comprising:
   a shaft member having a proximate end and a distal end, said shaft member including a motor positioned at the proximate end and a projecting handle spaced apart from said motor;
   means for cutting weeds positioned at the distal end of said shaft member;
   a wheeled guard assembly slidably attached along said shaft member, said guard assembly including:
   a rigid guard member of unitary construction, said guard member being configured with a rear base region, an inclined front region, and a groove formed in said inclined front region;
   an axle secured to the rear base region of said guard member;
   a pair of wheels rotatably mounted on said axle at opposite ends of the base region;
   a bracket attached to the front region of said guard member for slidably attaching said guard assembly along said shaft member, said bracket further including means for adjustably affixing said bracket along the shaft of the weed cutting machine, for height adjustment of said weeds cutting means;
   a plurality of removable straps for releasably attaching said bracket to the groove formed in said front region; and
   a bump wheel configured for stable attachment to said weeds cutting means;
   whereby, said weed trimmer apparatus provides a wheeled tripod arrangement for improved stability on a ground surface, and said guard member prevents weed trimmings from coming into contact with a user of the weed cutting machine.

6. The weed trimmer apparatus according to claim 5, wherein said guard member has a curvilinear triangular configuration.

7. The weed trimmer apparatus according to claim 5, wherein said guard member has a semicircular configuration.

8. The weed trimmer apparatus according to claim 5, including means for adjusting the height of said pair of wheels.

* * * * *